(12) United States Patent  
Larkin et al.

(10) Patent No.: US 7,933,891 B2  
(45) Date of Patent: Apr. 26, 2011

(54) WEB SERVICES DATA AGGREGATION SYSTEM AND METHOD

(75) Inventors: Michael K. Larkin, San Jose, CA (US); Howard Lee, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 11/688,155

(22) Filed: Mar. 19, 2007

(65) Prior Publication Data

US 2008/0052294 A1 Feb. 28, 2008

Related U.S. Application Data

(63) Continuation-in-part of application No. 10/256,124, filed on Sep. 26, 2002, now Pat. No. 7,194,482.

(51) Int. Cl.
*G06F 7/00* (2006.01)
*G06F 17/30* (2006.01)

(52) U.S. Cl. ......... 707/711; 707/717; 707/803; 707/809

(58) Field of Classification Search .............. 707/1, 694, 707/705, 717, 803, 809, 711
See application file for complete search history.

(56) References Cited

U.S. PATENT DOCUMENTS

| | | | |
|---|---|---|---|
| 5,379,419 A * | 1/1995 | Heffernan et al. ................... 1/1 |
| 5,793,964 A | 8/1998 | Rogers et al. ................ 395/200 |
| 5,946,696 A * | 8/1999 | Young ................................ 1/1 |
| 6,094,654 A * | 7/2000 | Van Huben et al. ................. 1/1 |
| 6,128,624 A | 10/2000 | Papierniak et al. .......... 707/104 |
| 6,216,173 B1 * | 4/2001 | Jones et al. ................... 715/705 |
| 6,269,362 B1 | 7/2001 | Broder et al. ..................... 707/4 |
| 6,421,681 B1 * | 7/2002 | Gartner et al. ...................... 1/1 |
| 6,799,182 B2 | 9/2004 | Bata ............................. 707/101 |
| 6,839,896 B2 | 1/2005 | Coffman et al. ............. 719/310 |
| 7,266,764 B1 * | 9/2007 | Flam ............................. 715/209 |
| 2001/0013020 A1 | 8/2001 | Yoshida et al. ................. 705/50 |
| 2001/0018680 A1 | 8/2001 | Park et al. ....................... 705/39 |
| 2001/0034771 A1 | 10/2001 | Hutsch ......................... 709/217 |

(Continued)

FOREIGN PATENT DOCUMENTS

EP 0981232 2/2000
WO WO 01/63418 8/2001

OTHER PUBLICATIONS

Nihei et al., An Intelligent Information Retrieval System for WWW Pages, Ninth International Workshop on Database and Expert Systems Applications, Aug. 26-28, 1998.

*Primary Examiner* — John E Breene
*Assistant Examiner* — Mark E Hershley
(74) *Attorney, Agent, or Firm* — Kunzler Needham Massey & Thorpe (57) ABSTRACT

A method and system for collecting and reviewing data related to web services receives service criteria from a service requester, selects candidate services that match the service criteria, invokes the selected candidate services, and aggregates results provided by the candidate services. In conjunction with aggregating results, the method and system builds service result objects conforming to a composite schema constructed from the various result schemas. To increase the utility of the aggregated results, metadata such as an invocation timestamp are also attached to each service result object. Result values are inspected and enumerated within a results table that may be used to determine which service result objects contain a particular result value.

12 Claims, 6 Drawing Sheets

U.S. PATENT DOCUMENTS

| | | | |
|---|---|---|---|
| 2002/0147611 A1* | 10/2002 | Greene et al. | 705/1 |
| 2002/0161745 A1* | 10/2002 | Call | 707/1 |
| 2002/0169852 A1* | 11/2002 | Schaeck | 709/218 |
| 2002/0178254 A1* | 11/2002 | Brittenham et al. | 709/224 |
| 2003/0182392 A1* | 9/2003 | Kramer | 709/217 |
| 2003/0187841 A1* | 10/2003 | Zhang et al. | 707/4 |
| 2003/0229640 A1* | 12/2003 | Carlson et al. | 707/100 |
| 2003/0233631 A1* | 12/2003 | Curry et al. | 717/100 |

* cited by examiner

WEB SERVICES DATA AGGREGATION SYSTEM AND METHOD

CROSS-REFERENCES TO RELATED APPLICATIONS

This application is a continuation-in-part of and claims priority to U.S. patent application Ser. No. 10/256,124 entitled "WEB SERVICES DATA AGGREGATION SYSTEM AND METHOD" and filed on Sep. 26, 2002 now U.S. Pat. No. 7,194,482 for Michael K. Larkin and Howard Lee, which is incorporated herein by reference.

BACKGROUND OF THE INVENTION

1. The Field of the Invention

The invention relates to systems and methods for managing data from disparate sources. Specifically, the invention relates to methods, and systems for collecting and reviewing data related to network accessible services such as Web Services.

2. The Relevant Art

The increased interconnectivity, computing power, and publishing capabilities associated with the growth of the Internet have spurred acceptance and deployment of electronic commerce and other inter-network enabled applications. Corporations, individuals, and organizations of all types are now interacting and conducting commerce through this exponentially increasing medium. The expanding potential of the medium presents opportunities for new applications and methods of doing business as well as automation of existing intra-entity and inter-entity processes and systems.

Despite the tremendous potential of the Internet, barriers to the full exploitation of electronic commerce remain. For example, computing systems from different cooperating entities often have difficulty communicating. Typically, expensive custom programming is required. The cost and delays associated with linking different systems into a single common system have limited deployment to these specific tasks and markets where cooperating entities are highly motivated to conduct business with one another.

A communications and computing paradigm often referred to as Web Services provides a new model for creating network accessible applications. A significant focus of Web Services is on creating infrastructure for discovering, utilizing, and managing available services developed by various entities around the world. Several emerging standards such as WSDL (Web Services Description Language), UDDI (Universal Description, Discovery and Integration) and RDF (Resource Description Framework) attempt to provide publicly accessible means for publishing and utilizing Web Services.

To more fully understand what a Web Service is and how it is used in the context of a software program, and in order to more fully appreciate the deficiencies of the prior art, we can consider several fictitious businesses that provide Web Services dealing with securities trading such as stocks and bonds. Company A may publish a Web Service that will buy and sell stocks. Company B may also publish a Web Service that will also buy and sell stocks. Those Web Services may exhibit different calling conventions, perhaps accepting different parameters and returning different values based solely on the needs of each individual company.

These companies may also choose to publish WSDL documents to a UDDI registry to make the Web characteristics of each published service publicly available. Nevertheless, a customer of these services (in this case, a software program making invocations on the Web Services) must either previously know how to handle both companies' services, or limit themselves to using either one or the other. Hence, the need for a uniform and consistent representation of WSDL documents is readily seen by virtue of the deficiencies exhibited by the scenario described.

Despite the emerging efforts to automate inter-entity interaction, human judgment and analysis remains a critical component. Systems and methods are needed to facilitate better automated discovery and analysis of informational and functional services such as Web Services. The ability to automatically collect, organize and display results provided by various services in a consistent manner would facilitate automated selection and deployment of useful services within network-based systems and applications.

BRIEF SUMMARY OF THE INVENTION

The apparatus of the present invention has been developed in response to the present state of the art, and in particular, in response to the problems and needs in the art that have not yet been fully solved by currently available Web Services discovery and integration systems and methods. Accordingly, it is an overall objective of the present invention to provide an improved system and method for collecting and presenting data from differing sources related to Web Services.

To achieve the foregoing objectives, and in accordance with the invention as embodied and broadly described herein in the preferred embodiments, an improved system and method are presented for aggregating and presenting data related to Web Services and the like. The improved system and method provide uniform and consistent means to select, invoke, and evaluate results obtained from Web Services.

In a first aspect of the invention, a system for collecting and accessing data related to Web Services includes one or more registries containing descriptions of Web Services, a candidate selection module, a dispatch module, and a data aggregation module.

The candidate selection module receives service criteria from a service requester, accesses the service descriptions within the registries, and provides a list of selected services that match the service criteria.

The dispatch module receives the list of selected services, references service definitions that define the format for invoking the candidate services, and invokes each selected service using likely parameter values included within the service criteria. In turn, the data aggregation module constructs a composite schema and aggregates results provided by the invoked services within service result objects conforming to the composite schema. In one embodiment, metadata such as a service location and timestamp are appended to the results data to increase the utility of the aggregated data.

The system for collecting and accessing data related to Web Services receives service requests from a service requester. In one embodiment, the service requests comprise a collection of name and value pairs that specify desired values for likely parameters. In response to service requests, the present invention performs tasks such as queries to service registries, consultations with service definitions, invocation of services, and aggregation of data from the invoked services. The tasks are performed without requiring direct knowledge by the service requester of the service directories, available Web Services, and their required parameters and formats. After completion of the necessary tasks, the system provides service information and/or service results to the service requester.

In a second aspect of the invention, the data aggregation module constructs a composite schema that is a superset of the individual result schemas from each selected web service.

Construction of a composite schema may occur previous to, or after reception of, actual results from service invocations. The composite schema is constructed in one embodiment by examining each element type within each results schema, conducting a test to determine if the composite schema contains sufficient entries corresponding to the element type, and adding an element to the composite schema if the composite schema lacks sufficient entries.

In one embodiment, the elements within each results schema are mapped to the composite schema. Mapping the elements within each results schema to the corresponding elements with the composite schema facilitates placing results data within service result objects conforming to the composite schema. In one embodiment, the mapping is accomplished by appending a label corresponding the element type with a type count indicating the number of elements of that type that have been encountered within the schema or result object that is currently being processed.

In a third aspect of the invention, the data aggregation module assembles a set of value lists that contain references to data elements that have a common value. In one embodiment, the references contained within value lists comprise memory pointers that point to data elements. The value lists expedite access, perusal and discovery of unknown relationships.

The value lists are assembled by examining each value returned from each invoked service, creating a new value list if the examined value is previously unknown, and adding a reference to the data element within a value list corresponding to the examined value. In one embodiment, the value lists are accessed through a value table in which the entries within the value table correspond to keys generated by a generating function such as a hashing function.

The resulting structure of the value table and the value lists facilitates aggregation, review, and access to data from disparate or heterogeneous sources in an efficient and uniform manner. The resulting structure also facilitates discovery of normally unseen data relationships. In addition to organizing by value, the aggregation of results data may be organized by other attributes such as element type.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
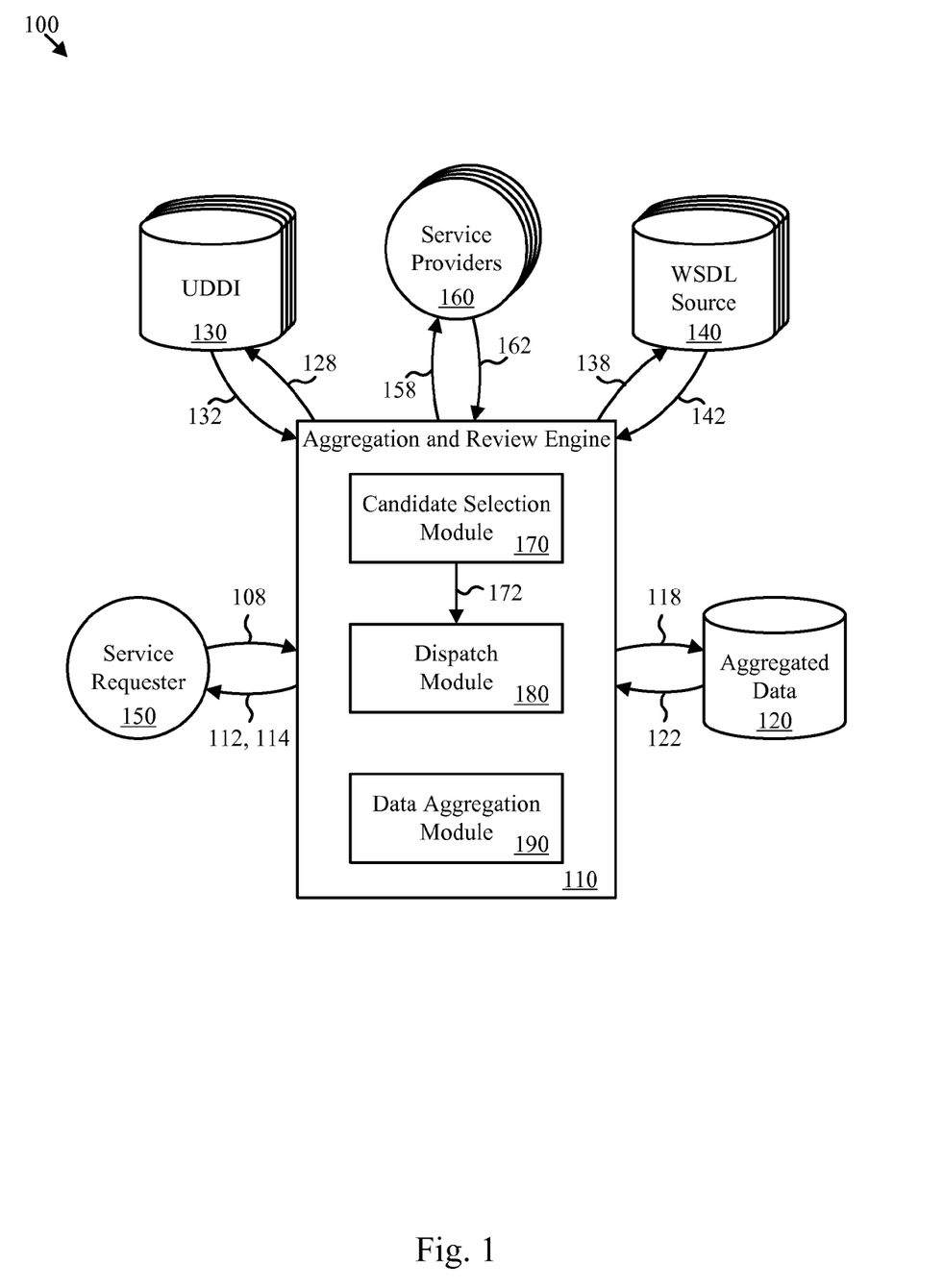
FIG. 1 is a block diagram illustrating one embodiment of a Web Services data aggregation and perusal system of the present invention.

Referring to FIG. 1, a Web Services data aggregation and review system 100 includes an aggregation and review engine 110, and an aggregated data store 120. In addition to the data store 120, the aggregation and review engine 110 is preferably interconnected with, or has access to, one or more service registries 130 and one or more service definitions 140. The Web Services data aggregation and review system 100 addresses many of the problems and issues inherent in the prior art discovery and integration techniques as discussed in the Background Section above.

In operation, the aggregation and review engine 110 receives service requests 108 from a service requester 150. The service requests 108 result in tasks being performed by the engine 110 such as queries to the service registries 130, consultations with the service definitions 140, invocation of services from one or more service providers 160, and information storage to and retrieval from the aggregated data store 120. The performed tasks typically result in the engine 110 providing service information 112 and/or service results 114 to the service requester 150.

In one embodiment, the service requests 108 include a collection of name and value pairs that specify parameter values for various likely parameter names. The collection of name and value pairs is used by the aggregation and review engine 110 to initialize parameter values when invoking the selected Web Services. The collection of name and value pairs is preferably an extensive, diverse, and redundant set in that the precise parameter names may differ widely between the potentially available services.

The service registries 130 contain service descriptions that describe the functionality of available Web Services along with general information such as web service names, locations, and service types. Additionally, the service registries 130 typically function as a directory listing service and provide convenient access points for locating services distributed throughout an intra-network or inter-network. In one embodiment, the service registries 130 are accessible through various keys such as entity name for white pages access and entity type for yellow pages access.

In the depicted embodiment, the service registries 130 receive directory queries 128 and provide directory results 132. The directory queries 128 and the directory results 132 conform to the directory services specification. In the embodiment of FIG. 1, the directory queries 128 and the directory results 132 conform to the UDDI specification. Namely, in this embodiment a directory query 128 includes invocation of the UDDI find-business method and the directory results 132 includes a UDDI businessList structure.

The service definitions 140 contain detailed information necessary to exchange information electronically between a service requester and a service provider. For example, the service definitions 140 may contain detailed information on the format and parameters of service invocations 158 and service results 162. The service definitions 140 are accessed using definition queries 138. Access results are returned as definition results 142.

In one embodiment, the service definitions 140 and the definition results 142 conform to the emerging WSDL specification. For example, the service definitions 140 may define XML schemas used to package and parse data sent to and received from the service providers 160. For convenience, the service definitions may be co-located with the service registries 130, or the service providers 160.

The service definitions 140 include meta-tags or a similar abstraction that convey the nature of the parameters and results data. In one embodiment, the service definitions 140 include metadata conforming to the RDF specification. Meta-tags such as RDF metadata identify data in an abstract fashion that facilitates better data handling. For example, with the present invention, meta-tags facilitate better matching of name and value pairs included with the service requests 108 with name and values of invocation parameters defined by the service definitions 140. The presence of meta-tags such as RDF metadata also increases the possibility of finding related results data.

Internally, the aggregation and review engine 110 includes a candidate selection module 170, a dispatch module 180, and a data aggregation module 190. The candidate selection module 170 receives the service requests 108, validates those requests, provides the directory queries 128 to conduct searches within the registries 130, processes the directory results 132 returned by the registries 130, and provides a service list 172 to the dispatch module 180. In one embodiment the service list 172 comprises service definition objects (not shown) constructed from the service definitions 140. The service definition objects define the interface to the service providers 160 in a consistent service-independent manner that facilitates service invocation and aggregation of results data.

The dispatch module 180 receives the service list 172 and generates the service invocations 158 after consulting the service definitions 140 or the service definition objects. In one embodiment, the dispatch module 180 matches name and value pairs included with the service requests 108 with parameter names and values from the service definitions 140. The matching of names and values facilitates initialization of the parameters used in the service invocations 158.

In response to the service invocations 158, the service providers 160 provide the service results 162. The service results 162 are received and organized by the data aggregation module 190 and placed within the aggregated data store 120. In one embodiment, metadata such as the service location and an invocation timestamp are appended to the service results. The data aggregation module 190 also receives review requests from the service requester 150, accesses the aggregated data store 120, and provides service information 112 and/or service results 114 to the service requester 150.

Through the means described herein, the aggregation and review engine 110 facilitates discovery, invocation, and evaluation of Web Services without requiring direct knowledge of services, registries, invocation formats, invocation parameters, and the like.

Figure 2:
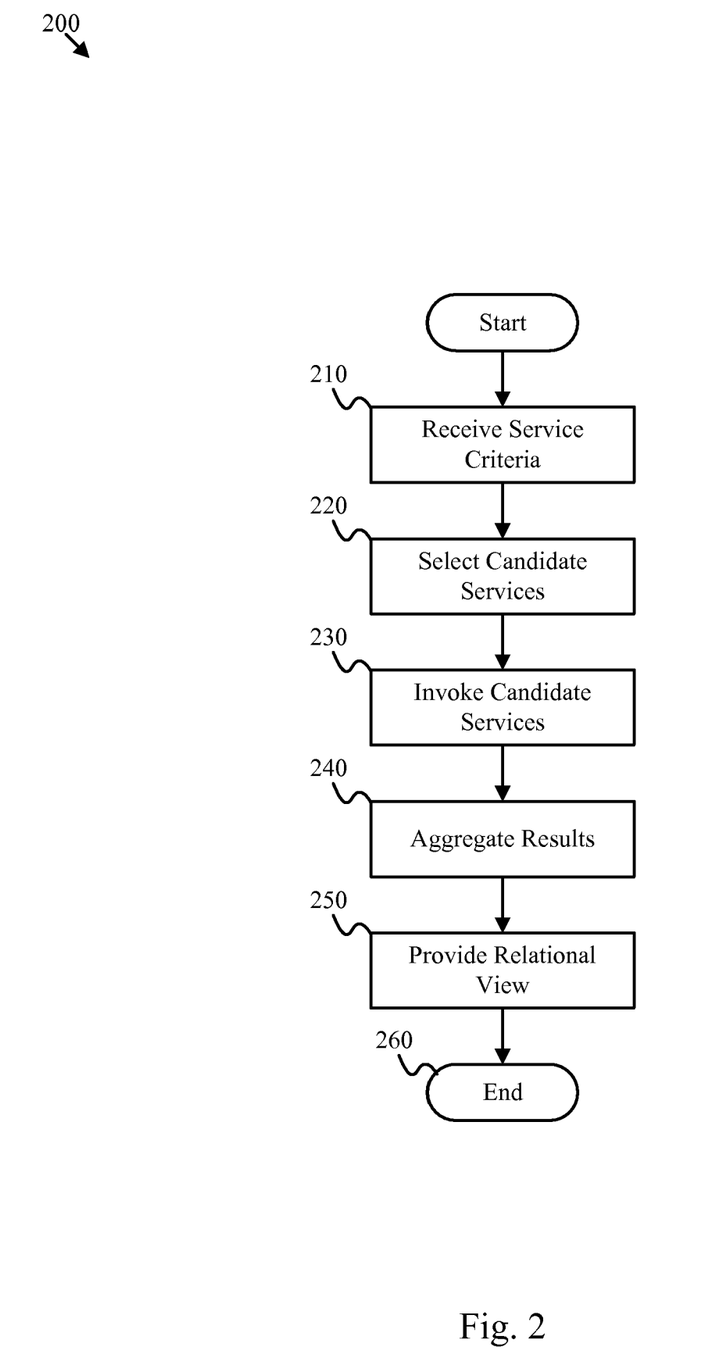
FIG. 2 is a flow chart diagram illustrating one embodiment of a Web Services data aggregation and review method of the present invention.

Referring to FIG. 2, a Web Services data aggregation and review method 200 of the present invention collects and organizes web service information and provides the Web Service information and results to service requesters. The Web Services data aggregation and review method 200 includes a receive criteria step 210, a select candidate services step 220, an invoke candidate services step 230, an aggregate results step 240, and a provide relational view step 250. The Web Services data aggregation and review method 200 may be conducted in conjunction with or independently of the Web Services data aggregation and perusal system 100.

The data aggregation and review method 200 commences with the receive criteria step 210. The receive criteria step 210 receives and validates service criteria such as the service criteria 108 described in conjunction with FIG. 1. In one embodiment, the receive criteria step 210 acknowledges reception of service criteria from the service requester and further acknowledges the validity or non-validity of the received service criteria.

Assuming valid service criteria, the data aggregation and review method 200 proceeds to the select candidate services step 220. The select candidate services step 220 conducts or invokes searches within one or more registries such as the service registries 130. The searches are conducted to find services registered with the service registries that match the service criteria received in step 210 and provide selected services (not shown). In one embodiment, the service registries support the UDDI specification and the select candidates services step 220 uses UDDI methods to access the service registries.

Upon finding services that match the service criteria, the method 200 proceeds to the invoke candidate services step 230. The invoke candidate services step 230 invokes, or sends messages to cause invocation of, the selected services such as those associated with the service providers 160 shown in FIG. 1. In one embodiment, invoking the selected services is performed via SOAP (Simple Object Access Protocol.) In another embodiment, invoking the selected services occurs using XML-RPC (Extensible Markup Language—Remote Procedure Call). The data aggregation and review method 200 proceeds from step 230 to the aggregate results step 240.

The aggregate results step 240 collects results returned by the invoked candidate services. In one embodiment, metadata such as the service location and invocation timestamp are appended to the results data to increase the utility of the results data. Preferably, the aggregate results step 240 creates a service result object for each invoked service, and the service result object contains fields conforming to a composite schema.

The present invention creates a composite schema by merging results schemas and removing redundant elements. In one embodiment, the schemas adhere to the XML schema specification. Conforming to a composite schema presents a common view of results data and provides a uniform interface for utilizing the results data. Construction of the composite schema will be described below in conjunction with FIGS. 3 and 5.

To facilitate review of the results data, certain embodiments of the aggregate results step 240 place references to service results objects within value lists. Each value list contains references to the service result objects that share a common result value independent of any schema structure. In certain embodiments, other lists such as element type lists are also assembled in order to facilitate analysis and discovery.

The data aggregation and review method 200 proceeds from the aggregate results step 240 to the provide relational view step 250. Associating service results objects with value lists and other lists as described in the aggregate results step 240 facilitates presenting views that enable discovery of, and exploitation of, relationships that otherwise would go unnoticed. For example, views may be presented to the service requester that allow the service requester to select any result value and display results from invoked services that have a similar result value.

In one embodiment, the provide relational view step 250 provides a default view of the results data that contains or shows the relationships contained within value lists. The provide relational view may also change the current view of the results data in response to requests from the service requester.

The provide relational view step 250 may persist across many usage sessions.

In certain embodiments, the aggregated results data accumulates with usage, and results data from various invocations is compared via the provided relational view. In the described embodiments, the ability to select various views of the results data persists indefinitely. In another embodiment, the data aggregation and review method 200 releases the aggregated results data and ends 260 in response to a termination request from the service requester.

Figure 3:
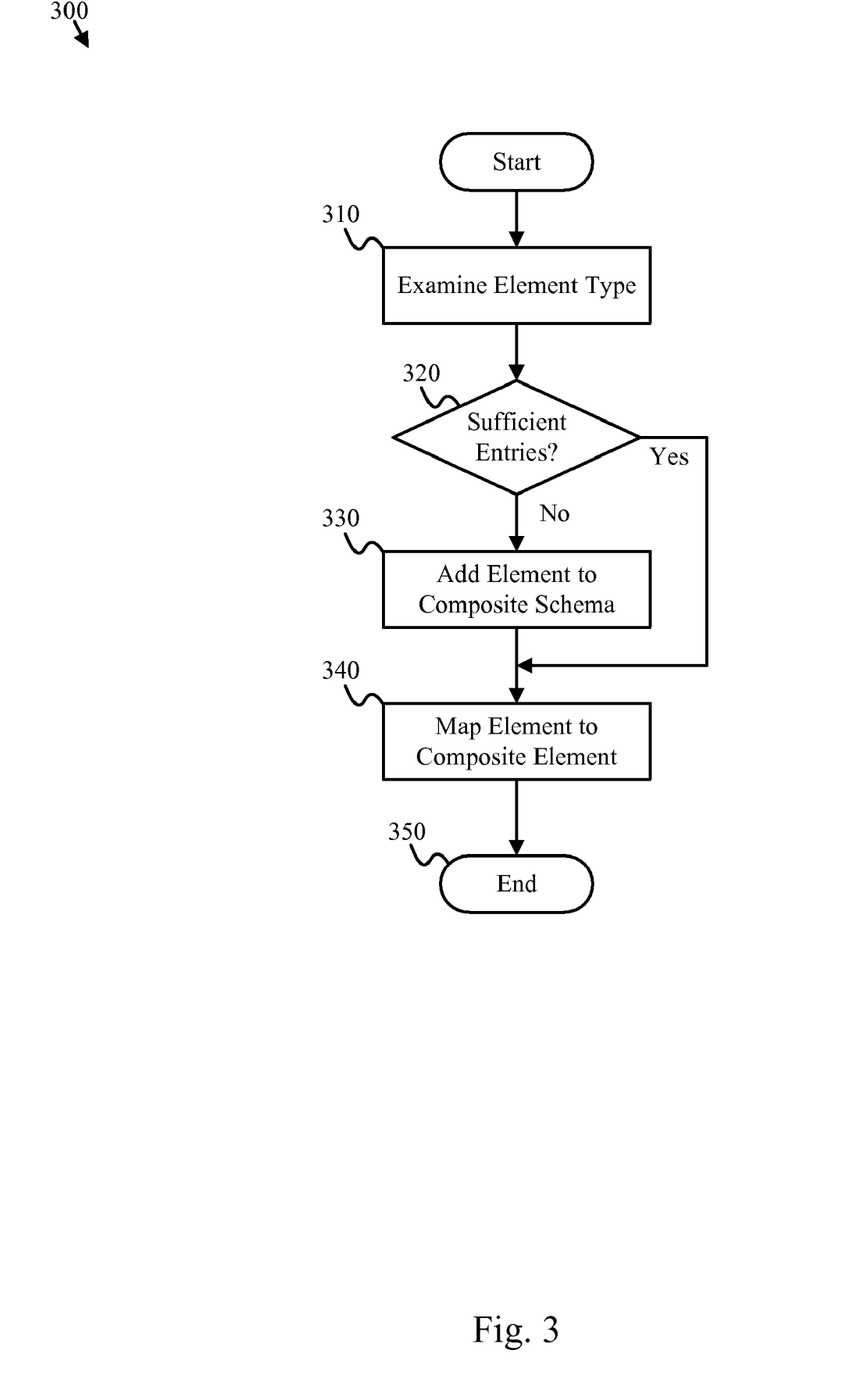
FIG. 3 is a flow chart diagram illustrating one embodiment of a composite schema construction method of the present invention.

Referring to FIG. 3, a composite schema construction method 300 may be conducted in conjunction with, or independent of, the data aggregation and review method 200. The composite schema construction method 300 in the depicted embodiment includes an examine type step 310, a sufficient entries test 320, an add element step 330, and a map element step 340. The composite schema construction method 300 is conducted on each individual element from a plurality of schemas, such as those defining results returned from service invocations. The method is used to construct a composite schema that facilitates handling data from disparate sources in a consistent manner.

The composite schema construction method 300 commences with the examine type step 310. The examine type step 310 inspects an individual element from a schema or result object that is being merged into the composite schema and ascertains the type of element that is being merged. The element type is then used to update a type count or some other tabulating mechanism that indicates the number of elements of that type that have been encountered within the schema or result object that is currently being processed.

After completion of the examine type step 310, the composite schema construction method 300 proceeds to the sufficient entries test 320. The sufficient entries test 320 ascertains whether sufficient entries of the examined type exist within the composite schema. In one embodiment, the sufficient entries test 320 comprises comparing a type count of the schema or result object that is currently being processed, with a type count for the composite schema. If an acceptable match exists, the composite schema construction method 300 skips to the map element step 340. If there are not sufficient entries within the composite schema, the method proceeds to the add element step 330. An acceptable match is an exact match of the data types or alternatively, the substitution of data types that would not result in data loss or truncation.

The add element step 330 adds an element of the examined type to the composite schema. Adding an element ensures that sufficient entries exist within the composite schema. After the add element step 330, the composite schema construction method 300 proceeds to the map element step 340.

The map element step 340 maps the element that is currently being processed within the schema or result object that is currently being processed to a corresponding element within the composite schema. In one embodiment, the mapping is accomplished by appending the type count onto a label corresponding to the element type. Examples of the results of the map element step 340 can be found within the fourth column of the result schemas 400 shown in FIG. 4.

The mapping of schema elements to composite schema elements facilitates moving results data from disparate sources into structures or objects conforming to the composite schema. Structures or objects conforming to the composite schema may be handled and accessed in a consistent manner regardless of origin and content. After completion of the map element step 340, the composite schema construction method 300 ends 350.

Figure 4:
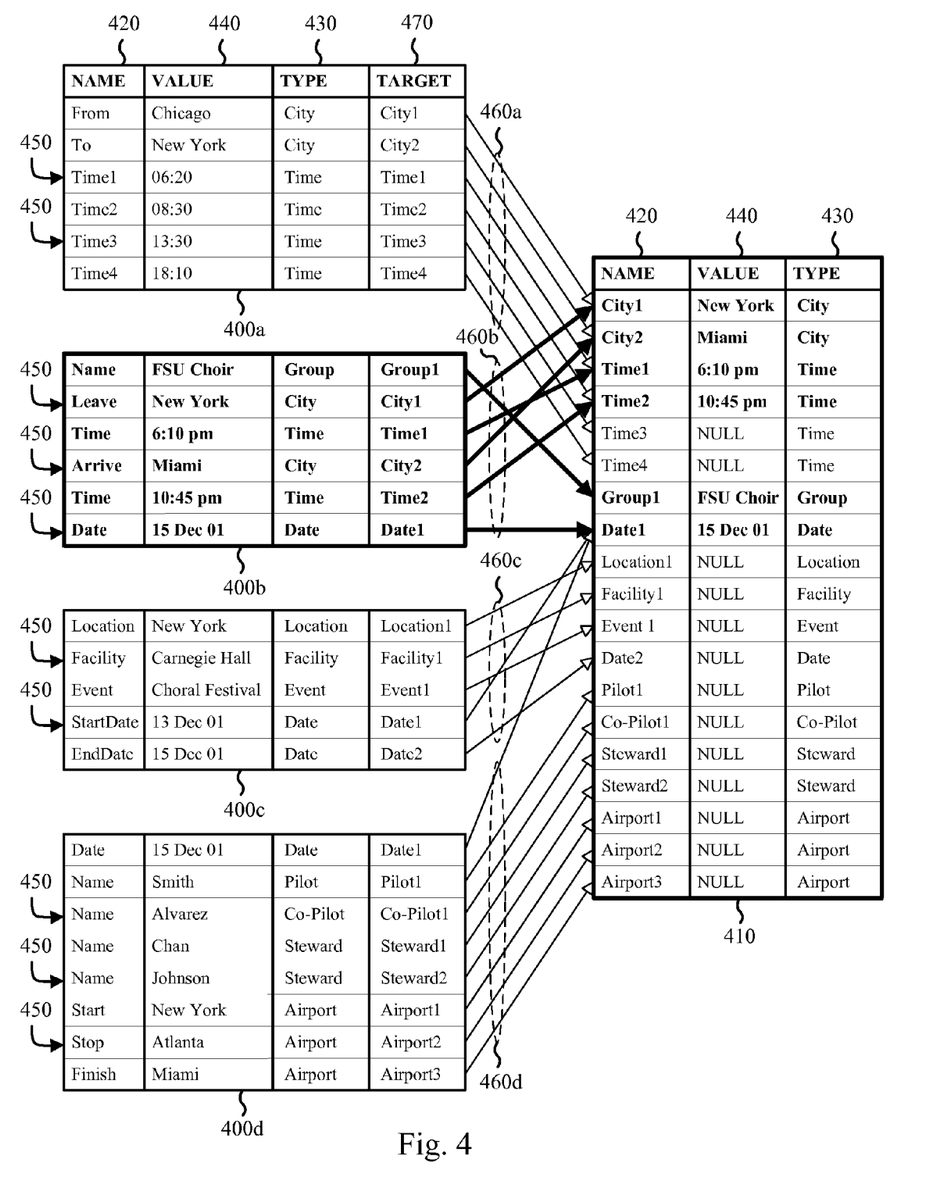
FIG. 4 is a set of example tables depicting the results of the composite schema construction method of FIG. 3.

FIG. 4 illustrates the utility of the composite schema construction method 300. As depicted, a plurality of result schemas 400 are used to create a composite schema 410. The result schemas 400 and the composite schema 410 include a name field 420 and a type field 430. Construction of a composite schema may occur prior to or after reception of actual results from service invocations. For example, in one embodiment a composite schema is constructed prior to receiving results data by conducting the composite schema construction method 300 in conjunction with consulting the service definitions 140 shown in FIG. 1.

The rows within the depicted schemas represent schema elements 450. For purposes of illustration, the result schemas 400 and the composite schema 410 contain simple non-hierarchical elements and the elements are populated with sample data within a value field 440. The composite schema 410 contains enough elements of each particular type to represent any particular result schema 400. In essence, the composite schema 410 is a superset of all of the result schemas 400. Typically, results data received from invoking a particular web service corresponds to a relatively small subset of the composite schema elements.

In one embodiment of the present invention, results data are stored within service result objects conforming to a composite schema. For purposes of illustration, the depicted composite schema 410 is populated with data corresponding to data from the depicted result schema 400b. Schema elements within the depicted composite schema 410 that have no corresponding element within the depicted result schema 400b are shown populated with NULL values.

Providing a consistent view of the results data as well as consistent methods to access results data are achieved in part by mapping the results data into the format of the composite schema as shown by each mapping 460. In the depicted example, the mapping occurs via a target element field 470 (fourth column of the result schemas 400) for each element 450 within the result schemas 400. For example, in one embodiment the target element field is a composite element field name. In another embodiment, the target element field is an element index or offset.

Figure 5:
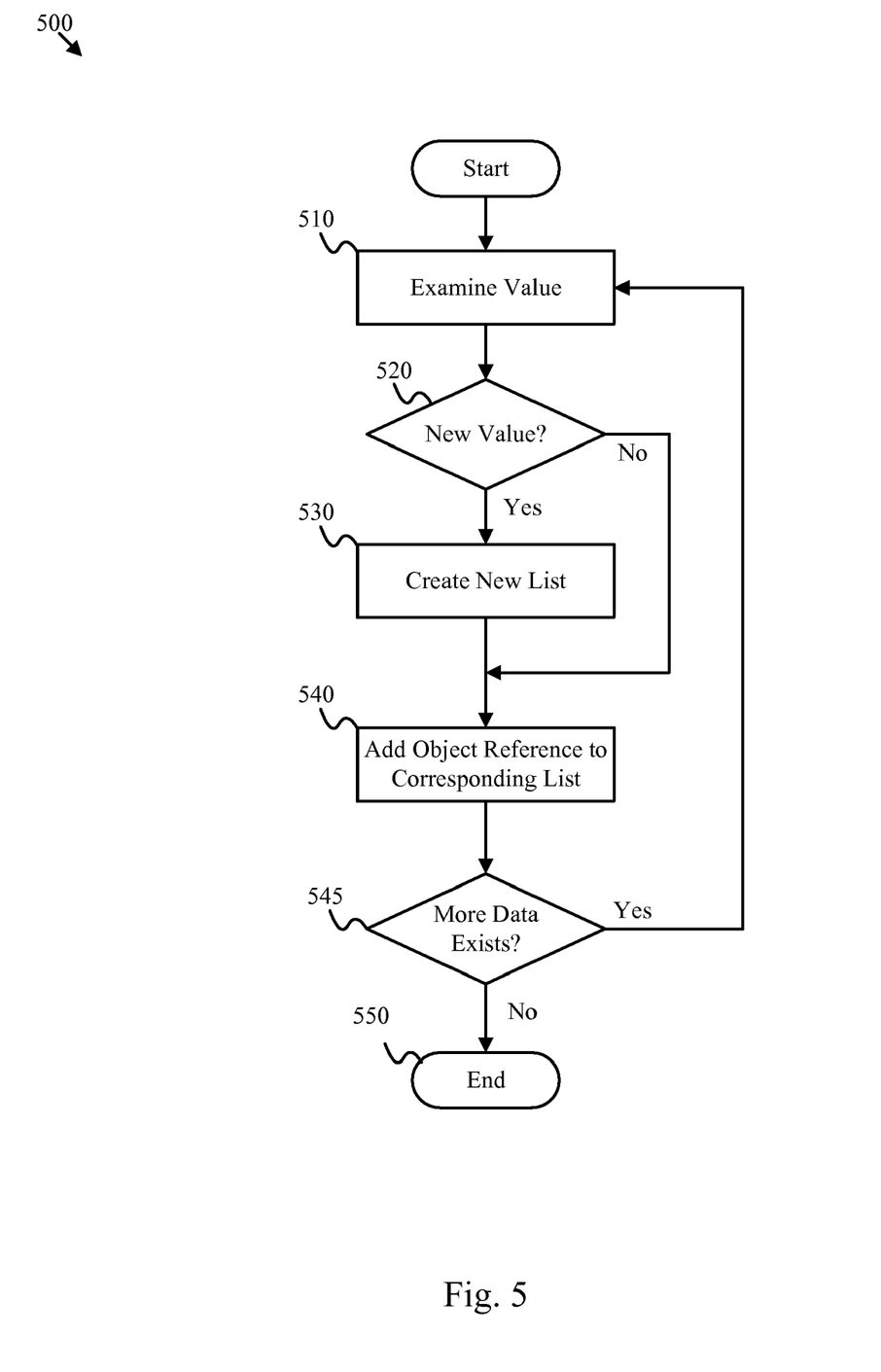
FIG. 5 is a flow chart diagram illustrating one embodiment of a data aggregation method of the present invention.

Referring to FIG. 5, a data aggregation method 500 may be conducted in conjunction with, or independent of, the aggregate results step 240 of the data aggregation and review method 200. The data aggregation method 500 includes an examine value step 510, a new value test 520, a create list step 530, and an add object reference step 540.

The data aggregation method 500 essentially creates a set of reference tables or lists that expedite access, review and discovery of unknown relationships. Each table or list references one or more data elements that correspond to a unique reference value. In one embodiment, the references contained within reference tables or lists comprise memory pointers that point to data elements. The data aggregation method 500 is preferably conducted for each data element within data objects that are the objects of interest, such as the result objects returned from invoking Web Services.

In the present invention the method 500 is conducted for each data element returned from each invoked web service and the references within the reference tables or lists point to data elements within service result objects. In certain embodiments, other lists such as element type lists may be assembled by adapting the method 500 in an appropriate manner.

The data aggregation method 500 begins with the examine value step 510. The examine value step 510 ascertains the value of an individual data element. In one embodiment the examine value step 510 conducts a hashing algorithm to reduce large values to a manageable size. After ascertaining the value, the method 500 proceeds to the new value test 520.

The new value test 520 ascertains whether the value has been encountered within the previously processed data. In one embodiment, the new value test comprises accessing a value table containing pointers to value lists and testing for a null value. If the value has been previously encountered (i.e., the value list exists), the data aggregation method 500 skips to the add object reference step 540. Otherwise, a new value has been found and the method proceeds to the create new list step 530.

The create new list step 530 creates a list for a newly encountered value. In one embodiment, the created list comprises an array of memory pointers initialized to null values. After the create new list step 530, the data aggregation method 500 proceeds to the add object reference step 540.

The add object reference step 540 adds a reference to the examined data element within the appropriate list. For example, in one embodiment adding a reference to the examined data element comprises appending a pointer to the examined data element to the appropriate list. Upon completion of the add object reference step 540, the data aggregation method checks in a step 545 to see whether more data exists. If so, the method 500 loops back to the step 510 and repeats. This continues until no more data exists, whereupon the method 500 ends 550.

Figure 6:
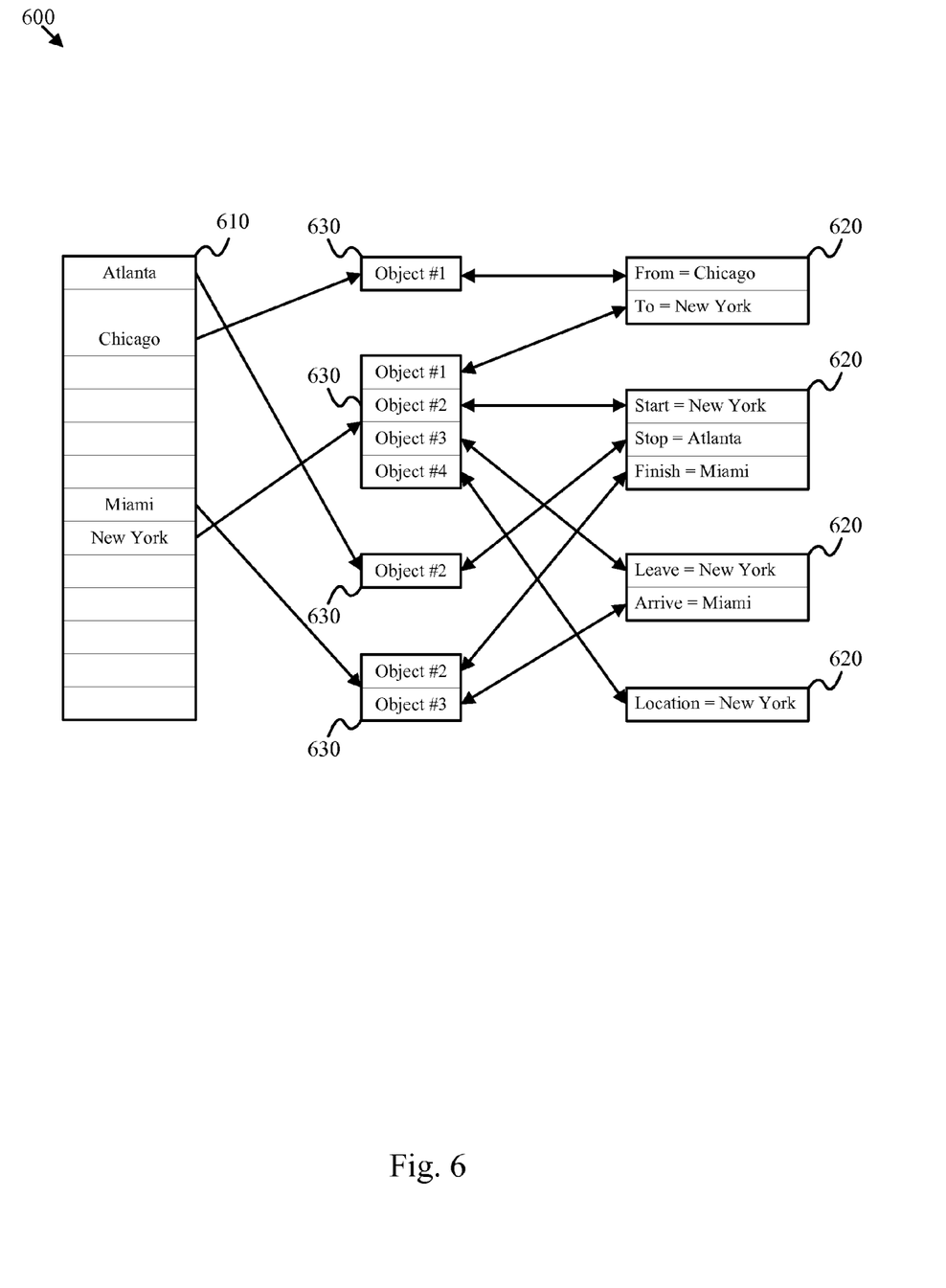
FIG. 6 is a block diagram illustrating data structures related to collecting and reviewing data from disparate sources in general and the method of FIG. 5 in particular.

FIG. 6 illustrates the effect of the data aggregation method 500 in the form of aggregated data 600. The source data for the depicted aggregated data 600 is the example results data shown within the result schemas 400 of FIG. 4. The depicted structure of the aggregated data 600 may be used to aggregate and review results data such as service result objects created by the Web Services data aggregation and review method 200. In addition to organization by value, the depicted structure may be adapted to organize by other identifiers such as element type. In order to simplify the illustration, the depicted results are restricted to values from data elements having airport, city, and location element types.

The aggregated data 600 includes a reference table or list 610, a plurality of individual objects 620, and a plurality of lists 630. The aggregated data 600 is structured in a manner that facilitates aggregation, review, and access to data from disparate or heterogeneous sources in an efficient uniform manner. The structure of the aggregated data 600 also facilitates discovery of normally unseen data relationships.

A reference table or list 610 facilitates mapping specific values to corresponding individual result objects 620. Each of the corresponding individual result objects 620 that have a specific value are enumerated within the lists 630 via a reference such as a pointer or an index. In one embodiment, the reference table or list 610 is a hash table and values may be converted to a value table index via a generating function (not shown). To facilitate repeated access to the reference table or list 610 and the lists 630, a value table index or a value list pointer may also be stored within the disparate result objects 620.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for collecting and accessing data related to Web Services, the system comprising:
    a program storage medium storing instructions;
    a processor executing the instructions, the instructions comprising
        at least one registry that stores descriptions of services;
        a candidate selection module that receives service criteria from a service requester, accesses the descriptions of services, and provides a list of candidate services that match the service criteria;
        a dispatch module that receives the list of candidate services and invokes each service contained therein; and
        a data aggregation module that receives a plurality of result objects provided by the candidate services, each result object comprising a field name, a field type, a value, and a target name, examines an element type of each element within each result object schema, counts the element type with a type count, aggregates the result objects provided by the invoked services into a composite schema comprising each target name of each result in response to receiving at least a specified number of result objects with a match of first data types, maps the element to the composite schema with a label of the element type appended with the type count for the target name, builds service result objects conforming to the composite schema, maps each value to the service result objects, aggregates metadata comprising service location and invocation timestamps, and creates a list of each value with a pointer to the results object of the value if the examined value is previously unknown by examining each value within each result object and comparing each examined value with known values.

2. A method for collecting and accessing data related to Web Services, the method comprising:
    receiving, by use of a processor, service criteria from a service requester;
    accessing descriptions of services;
    providing a list of candidate services that match the service criteria;
    selecting candidate services that match the service criteria;
    invoking the candidate services;
    receiving a plurality of result objects provided by the candidate services, each result object comprising a field name, a field type, a value, and a target name;
    aggregating result objects provided by the candidate services into a composite schema comprising each target name of each result in response to receiving at least a specified number of result objects with a match of first data types by examining an element type of each element within each result object schema, counting the element type with a type count, mapping the element to the composite schema with a label of the element type appended with the type count for the target name, building service result objects conforming to the composite schema, and mapping each value to the service result objects, aggregating metadata comprising service location and invocation timestamps; and
    creating a list of each value with a pointer to the results object of the value if the examined value is previously unknown by examining each value within each result object and comparing each examined value with known values.

3. The method of claim 2, wherein the service criteria comprises name-value pairs.

4. The method of claim 2, wherein the metadata includes invocation timestamps.

5. The method of claim 2, further comprising adding an element to the composite schema if the composite schema lacks sufficient entries.

6. The method of claim 2, wherein comparing the examined value with known values comprises generating a key and accessing a table.

7. The method of claim 2, wherein selecting candidate services comprises searching a registry.

8. An apparatus for collecting and accessing data related to Web Services, the apparatus comprising:
a program storage medium storing instructions;
a processor executing the instructions, the instructions comprising means for storing descriptions of services;
means for receiving service criteria from a service requester, accessing the descriptions of services, and providing a list of candidate services that match the service criteria;
means for receiving the list of candidate services and invoking each service contained therein; and
means for receiving a plurality of result objects provided by the candidate services, each result object comprising a field name, a field type, a value, and a target name, examining an element type of each element within each result object schema, counting the element type with a type count, aggregating the result objects provided by the invoked services into a composite schema comprising each target name of each result in response to receiving at least a specified number of result objects with a match of first data types, mapping the element to the composite schema with a label of the element type appended with the type count for the target name, building service result objects conforming to the composite schema, mapping each value to the service result objects, aggregating metadata comprising service location and invocation timestamps, and creating a list of each value with a pointer to the results object of the value if the examined value is previously unknown by examining each value within each result object and comparing each examined value with known values.

9. An article of manufacture comprising a program storage medium readable by a processor and storing one or more instructions executed by processor to perform a method for collecting and accessing data related to Web Services, the method comprising:
receiving, by use of the processor, service criteria from a service requester;
accessing descriptions of services;
providing a list of candidate services that match the service criteria;
selecting candidate services that match the service criteria;
invoking the candidate services;
receiving a plurality of result objects provided by the candidate services, each result object comprising a field name, a field type, a value, and a target name;
aggregating result objects provided by the candidate services into a composite schema comprising each target name of each result in response to receiving at least a specified number of result objects with a match of first data types by examining an element type of each element within each result object schema, counting the element type with a type count, mapping the element to the composite schema with a label of the element type appended with the type count for the target name, building service result objects conforming to the composite schema, and mapping each value to the service result objects, aggregating metadata comprising service location and invocation timestamps; and
creating a list of each value with a pointer to the results object of the value if the examined value is previously unknown by examining each value within each result object and comparing each examined value with known values.

10. The article of manufacture of claim 9, wherein the service criteria comprises name-value pairs.

11. The article of manufacture of claim 9, wherein the metadata includes invocation timestamps.

12. A method for aggregating data from individual sources, the method comprising:
receiving, by use of a processor, service criteria from a service requester, wherein the service criteria comprises name-value pairs;
accessing descriptions of services;
providing a list of candidate services that match the service criteria;
selecting candidate services that match the service criteria;
invoking the candidate services;
receiving a plurality of result objects provided by the candidate services, each result object comprising a field name, a field type, a value, and a target name;
aggregating result objects provided by the candidate services into a composite schema comprising each target name of each result in response to receiving at least a specified number of result objects with a match of first data types by examining an element type of each element within each result object schema, counting the element type with a type count, mapping the element to the composite schema with a label of the element type appended with the type count for the target name, building service result objects conforming to the composite schema, and mapping each value to the service result objects, aggregating metadata comprising service location and invocation timestamps; and
creating a list of each value with a pointer to the results object of the value if the examined value is previously unknown by examining each value within each result object and comparing each examined value with known values.

* * * * *